(12) United States Patent
Landacre (10) Patent No.: US 10,473,229 B2
(45) Date of Patent: Nov. 12, 2019

(54) DIAPHRAGM VALVE

(71) Applicant: MAC Valves, Inc., Wixom, MI (US)

(72) Inventor: Brett Anthony Landacre, Bloomfield Hills, MI (US)

(73) Assignee: MAC Valves, Inc., Wixom, MI (US)

( * ) Notice: Subject to any disclaimer, the term of this patent is extended or adjusted under 35 U.S.C. 154(b) by 5 days.

(21) Appl. No.: 15/714,320

(22) Filed: Sep. 25, 2017

(65) Prior Publication Data

US 2019/0093786 A1 Mar. 28, 2019

(51) Int. Cl.
*F16K 31/06* (2006.01)
*F16K 41/12* (2006.01)
*F16K 39/02* (2006.01)

(52) U.S. Cl.
CPC ...... *F16K 31/0693* (2013.01); *F16K 31/0655* (2013.01); *F16K 31/0675* (2013.01); *F16K 39/022* (2013.01); *F16K 41/12* (2013.01)

(58) Field of Classification Search
CPC .. F16K 31/06; F16K 31/0693; F16K 31/0644; F16K 31/0668; F16K 31/0672; F16K 31/0675; F16K 39/022
USPC .................................................. 251/129.17
See application file for complete search history.

(56) References Cited

U.S. PATENT DOCUMENTS

| | | |
|---|---|---|
| 1,385,681 A | 7/1921 | Hammond |
| 2,826,215 A * | 3/1958 | Wolfslau ............. F16K 31/0689 137/454.6 |
| 3,003,743 A | 10/1961 | Sattler |
| 3,098,635 A | 7/1963 | Delaporte |
| 3,570,806 A | 3/1971 | Sturman et al. |
| 3,985,333 A | 10/1976 | Paulsen |
| 4,254,938 A | 3/1981 | Inada et al. |
| 4,257,573 A | 3/1981 | Stampfli |
| 4,552,336 A | 11/1985 | Pastrone |

(Continued)

FOREIGN PATENT DOCUMENTS

| | | |
|---|---|---|
| JP | 2010523915 A | 7/2010 |
| JP | 2014-066340 A | 4/2014 |
| JP | 5952150 B2 | 7/2016 |

OTHER PUBLICATIONS

International Search Report and Written Opinion for EP18164937 dated Oct. 15, 2018.

(Continued)

*Primary Examiner* — Ian G Paquette
(74) *Attorney, Agent, or Firm* — Harness, Dickey & Pierce, P.L.C.

(57) ABSTRACT

A diaphragm valve includes a solenoid body having a coil and a pole piece. An armature is configured to slide in the solenoid body along a longitudinal axis between energized and de-energized positions. A valve body cartridge is connected to the solenoid body. A valve member, connected to the armature, is configured to slide within the valve body cartridge when the armature moves. A biasing member acts to normally bias the armature toward the de-energized position. A diaphragm, extending inwardly from the valve body cartridge towards the valve body, is received between the armature and the valve member. A diaphragm support sleeve includes a support sleeve wall defining a sleeve cavity that receives the armature and a support sleeve flange that extends inwardly from the support sleeve wall to abut and support at least part of the diaphragm.

20 Claims, 4 Drawing Sheets

(56) References Cited

U.S. PATENT DOCUMENTS

| | | | |
|---|---|---|---|
| 5,060,695 A | 10/1991 | McCabe | |
| 5,967,487 A * | 10/1999 | Cook | F02M 25/0836 |
| | | | 251/129.07 |
| 5,975,489 A | 11/1999 | deCler et al. | |
| 6,854,706 B2 | 2/2005 | Sato et al. | |
| 6,892,998 B2 | 5/2005 | Newton | |
| 6,913,242 B2 | 7/2005 | Reichert et al. | |
| 6,923,202 B2 | 8/2005 | Enerson | |
| 7,004,450 B2 | 2/2006 | Yoshimura et al. | |
| 8,082,953 B2 | 12/2011 | Dayton | |
| 8,123,193 B2 | 2/2012 | Kratzer | |
| 8,151,824 B2 | 4/2012 | Williams et al. | |
| 8,167,000 B2 | 5/2012 | Neff et al. | |
| 8,783,653 B2 | 7/2014 | Jamison et al. | |
| 9,010,373 B2 | 4/2015 | Neff et al. | |
| 9,395,010 B2 | 7/2016 | Jamison et al. | |
| 9,829,112 B2 * | 11/2017 | Smith | F16K 41/103 |
| 2009/0189105 A1 | 7/2009 | Dayton | |
| 2012/0061600 A1 | 3/2012 | Neff et al. | |

OTHER PUBLICATIONS

Taiwan Office Action (w/English translation) dated May 20, 2019 in corresponding Taiwan Application No. 107112850.

* cited by examiner

DIAPHRAGM VALVE

FIELD

The present disclosure relates to solenoid operated valves and more particularly to a solenoid operated valve that is sealed by a diaphragm.

BACKGROUND

This section provides background information related to the present disclosure which is not necessarily prior art.

Solenoid operated valves, such as poppet valves, can be used to control the flow of a fluid, such as pressurized air, through a manifold. Such manifolds may be part of equipment such as sorters, packaging machines, food processors, and the like that are driven by the pressurized fluid. Such solenoid operated valves may be operated for millions of cycles. In order to retain the solenoid operated valve in a closed position when the solenoid is de-energized, biasing members such as springs are used. It is also known, for example in U.S. Pat. No. 4,598,736 to Chorkey, that fluid pressure can be balanced within the valve to reduce a solenoid force required to move a valve member between closed and open positions.

The valve member is slidingly arranged within a valve body cartridge. In the closed position, a valve member is generally held in contact with a valve seat of the valve body cartridge by the biasing member. In the open position, the solenoid generally moves the valve member away from the valve seat forming a clearance gap therebetween. As disclosed in U.S. Pat. No. 3,985,333 to Paulsen, a bellows shaped diaphragm can be used to provide a seal between the valve body cartridge and the solenoid. Such diaphragms prevent contaminants from working their way towards the solenoid while permitting longitudinal movement of the valve member.

The valve body cartridge is designed to be received in a bore provided in the manifold. The manifold usually includes multiple passageways that are arranged in fluid communication with the manifold bore. In operation, the solenoid operated valve controls fluid flow between these multiple passageways. O-ring seals are typically provided on the outside of the valve body cartridge to seal the valve body cartridge within the manifold bore.

SUMMARY

This section provides a general summary of the disclosure, and is not a comprehensive disclosure of its full scope or all of its features.

The subject disclosure provides for an improved diaphragm valve that includes a solenoid body and a valve body cartridge that is connected to the solenoid body. A coil, a pole piece, and an armature are positioned in the solenoid body. The armature can slide within the solenoid body along a longitudinal axis between an energized position and a de-energized position. A valve member is also disposed within the valve body cartridge. The valve member is connected to the armature and can slide within the valve body cartridge when the armature moves between the energized and de-energized positions. A biasing member, that acts to normally bias the armature toward the de-energized position, is also disposed in the solenoid body. A diaphragm extends inwardly from the valve body cartridge towards the valve member. The diaphragm is received between the armature and the valve member such that the diaphragm deflects in response to movement of the armature and the valve member along the longitudinal axis.

The diaphragm valve further includes a diaphragm support sleeve. The diaphragm support sleeve has a support sleeve wall and a support sleeve flange. The support sleeve wall defines a sleeve cavity that receives at least part of the armature. The support sleeve flange extends inwardly and is transverse to the support sleeve wall. The support sleeve flange abuts and supports at least part of the diaphragm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure, where.

Corresponding reference numerals indicate corresponding parts throughout the several views of the drawings.

DETAILED DESCRIPTION

Example embodiments will now be described more fully with reference to the accompanying drawings. These example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
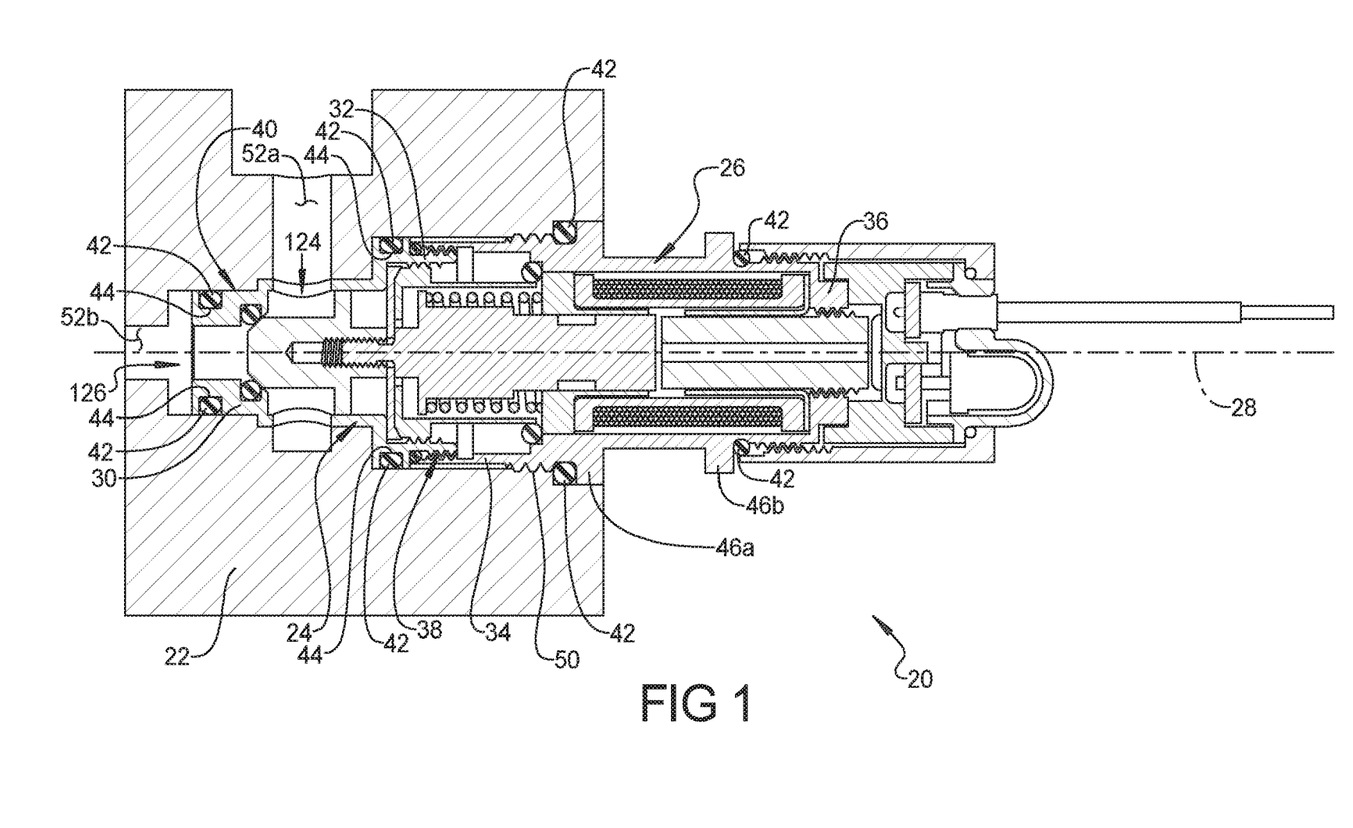
FIG. 1 is a side cross-sectional view of an exemplary manifold and an exemplary diaphragm valve constructed in accordance with the present disclosure.
Figure 2:
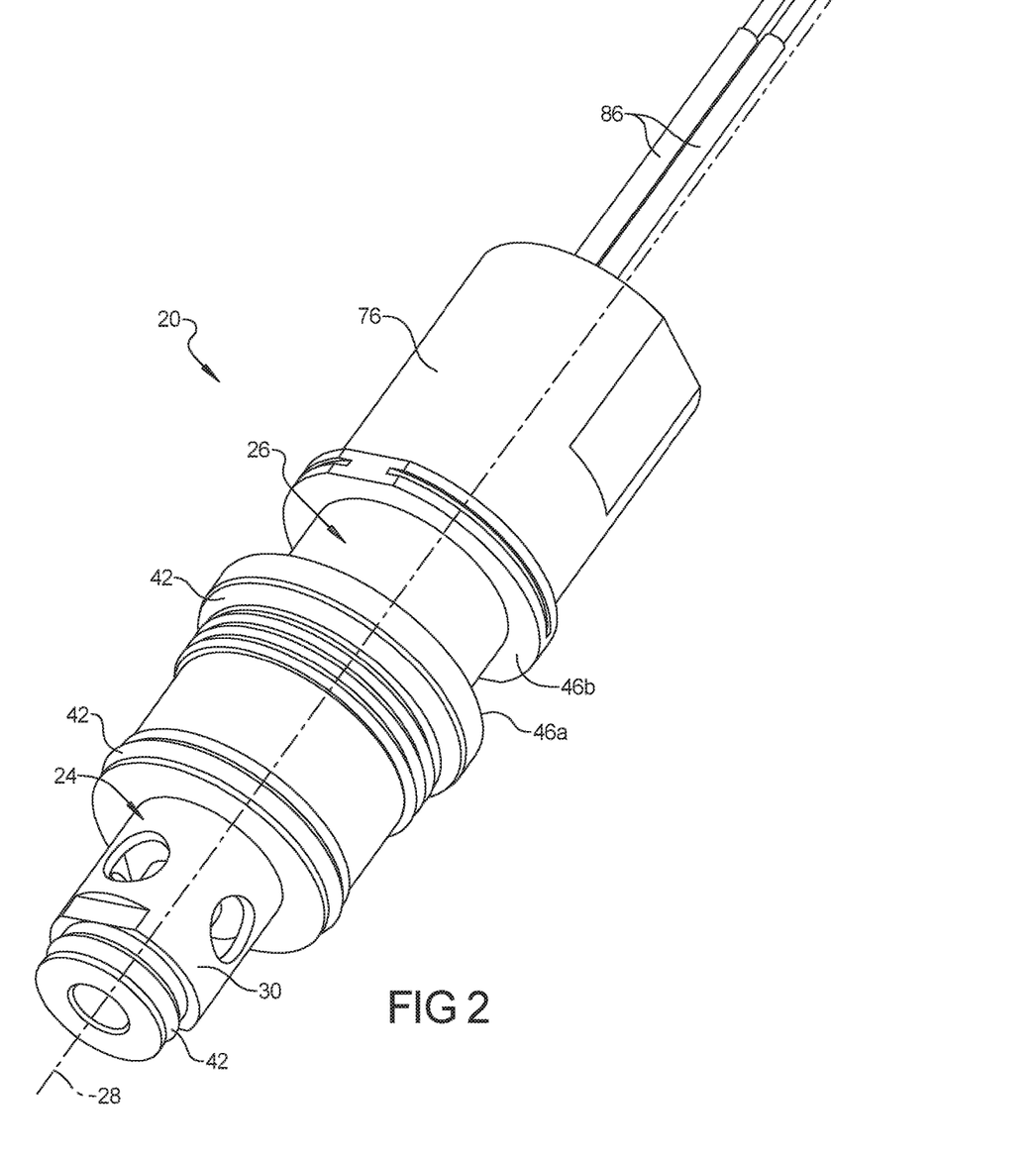
FIG. 2 is a front perspective view of the exemplary diaphragm valve illustrated in FIG. 1.

Referring to FIGS. 1 and 2, a diaphragm valve 20 is shown installed in a manifold 22. The diaphragm valve 20 includes a valve body cartridge 24 and a solenoid body 26 that are coaxially aligned with respect to a longitudinal axis 28. The valve body cartridge 24 extends longitudinally between a ported end 30 and a diaphragm receiving end 32. The solenoid body 26 extends longitudinally between an armature receiving end 34 and a pole piece receiving end 36. It should be appreciated that the terms "longitudinal," "longitudinally," "axial," and "axially," when used herein, mean along or parallel to the longitudinal axis 28. The diaphragm receiving end 32 of the valve body cartridge 24 and the armature receiving end 34 of the solenoid body 26 are releasably connected by threaded connection 38. The manifold 22 includes a manifold bore 40. The valve body cartridge 24 is slidably inserted into the manifold bore 40 of manifold 22. One or more seal members 42, such as O-rings, are positioned in one or more circumferential slots 44 created in valve body cartridge 24 and the solenoid body 26. The seal members 42 abut the manifold bore 40 to create a fluid seal.

The solenoid body 26 includes first and second collars 46a, 46b that extend radially outwardly away from the longitudinal axis 28. The solenoid body 26 also includes external threads 50 that engage the manifold bore 40 to secure the diaphragm valve 20 to the manifold 22. The manifold 22 includes passageways 52a, 52b disposed in fluid communication with the manifold bore 40. In operation, the diaphragm valve 20 controls the flow of fluid, such as pressurized air, between the passageways 52a, 52b of the manifold 22.

Figure 3:
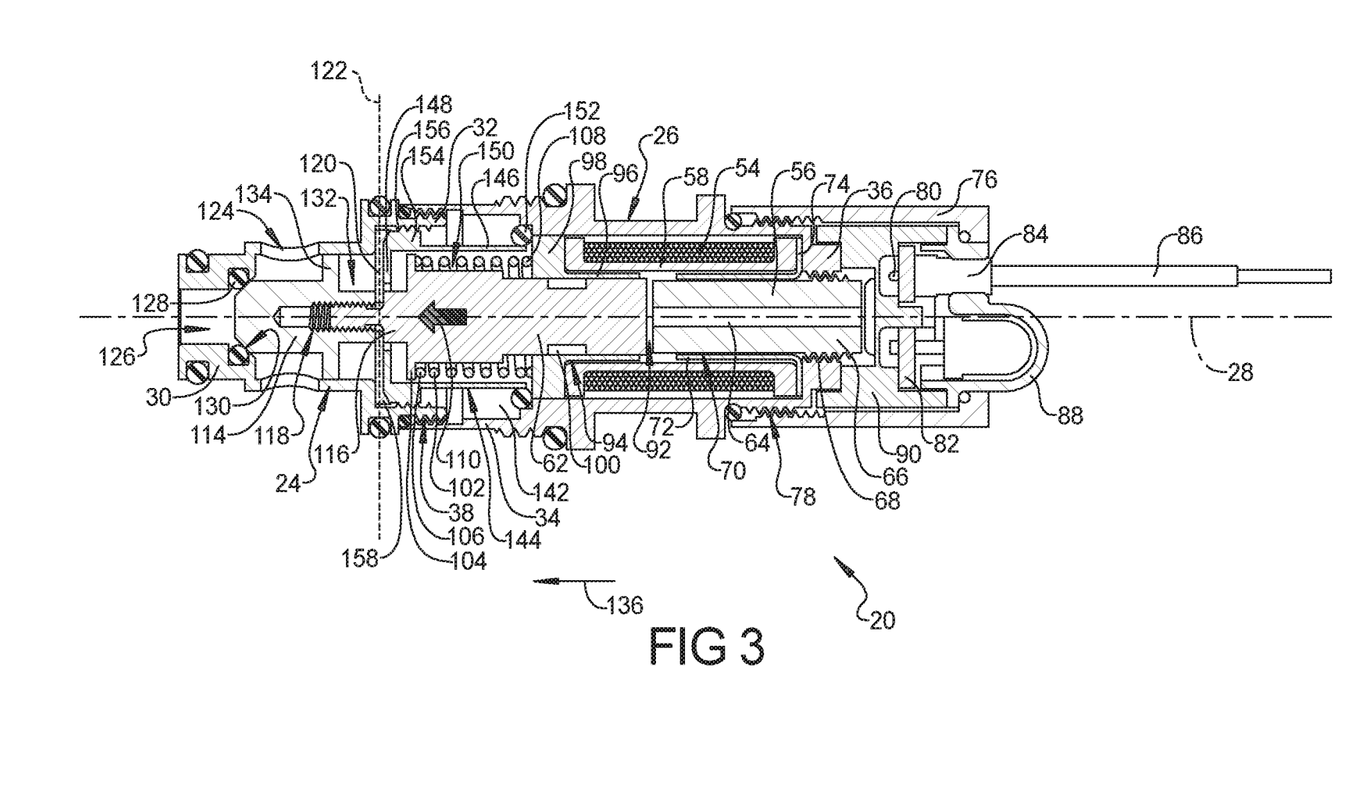
FIG. 3 is a side cross-sectional view of the exemplary diaphragm valve illustrated in FIG. 1 where the armature of the exemplary diaphragm valve is shown in a de-energized position.
Figure 4:
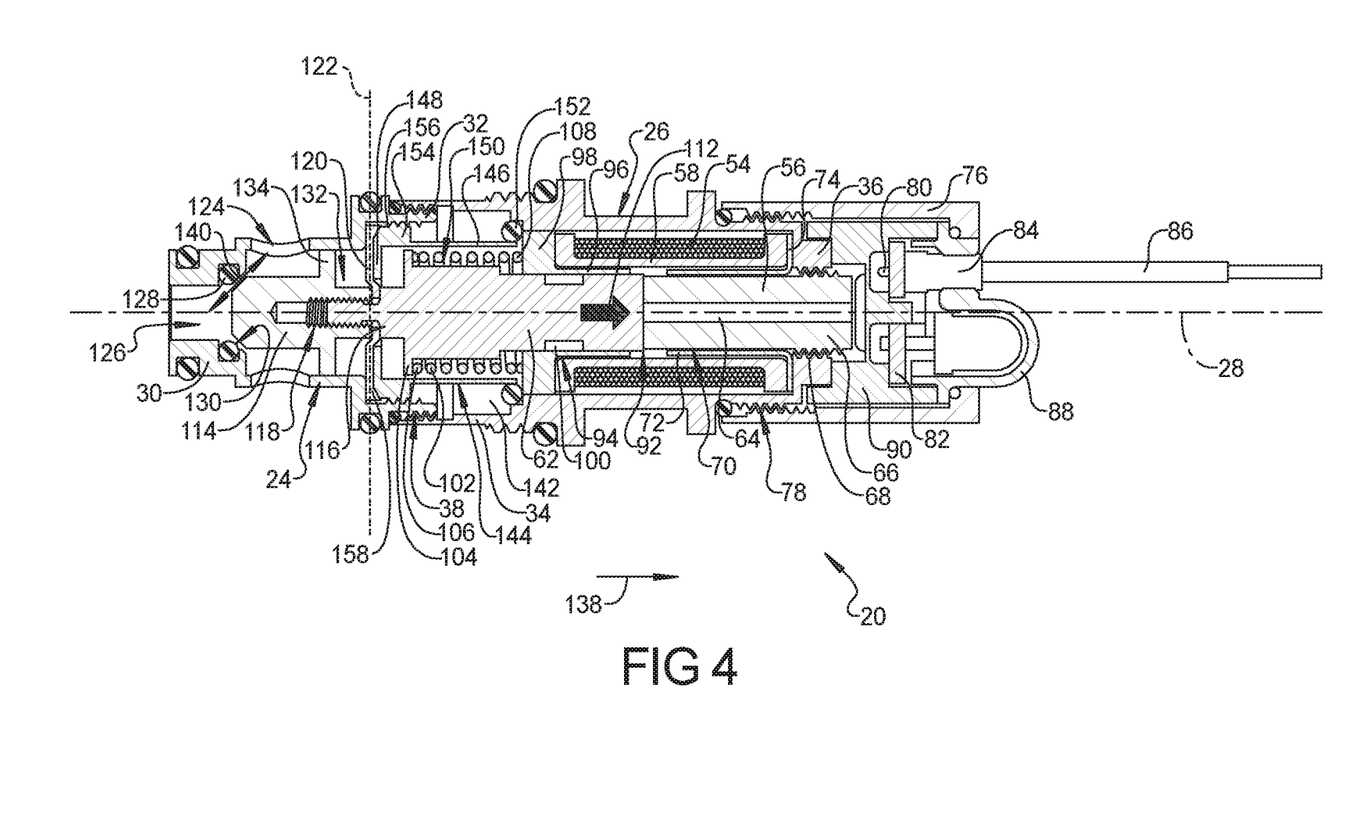
FIG. 4 is another side cross-sectional view of the exemplary diaphragm valve illustrated in FIG. 1 where the armature of the exemplary diaphragm valve is shown in an energized position.

With additional reference to FIGS. 3 and 4, a coil 54 and a pole piece 56 are positioned in the solenoid body 26. A bobbin 58, also disposed in the solenoid body 26, supports the coil 54. An armature 62 is slidably disposed in the solenoid body 26 for movement along the longitudinal axis 28 between a de-energized position (FIG. 3) and an energized position (FIG. 4). At least part of the pole piece 56 and at least part of the armature 62 are slidably received in the bobbin 58. The pole piece 56 may include a pressure equalizing passage 64 that extends through the pole piece 56 along the longitudinal axis 28. The pole piece 56 may also include a threaded end 66 that engages internal threads 68 in the pole piece receiving end 36 of the solenoid body 26. Accordingly, the axial position of the pole piece 56 is adjustable by rotating pole piece 56 relative to the solenoid by about the longitudinal axis 28.

The pole piece 56 is disposed within a pole piece sleeve 70. The pole piece sleeve 70 includes a pole piece sleeve wall 72 and a pole piece sleeve flange 74. The pole piece sleeve wall 72 is positioned radially between the bobbin 58 and at least part of the pole piece 56. The pole piece sleeve flange 74 extends radially outwardly from the pole piece sleeve wall 72 towards the solenoid body 26. The pole piece sleeve wall 72 maintains coaxial alignment of pole piece 56 with the bobbin 58, the coil 54, and the solenoid body 26 when the axial position of the pole piece 56 is adjusted by rotating pole piece 56 relative to the solenoid about the longitudinal axis 28.

An electrical cover 76 is releasably connected to the pole piece receiving end 36 of the solenoid body 26 by threaded connection 78. The electrical cover 76 includes multiple electrical contacts 80 on a printed circuit board (PCB) 82 that are electrically connected to the coil 54. The electrical contacts 80 are configured to mate with an electrical connector 84, connected to one or more electrical wire leads 86, that supplies electricity to the diaphragm valve 20. Optionally, the electrical cover 76 may receive a connector seal 88 disposed between the electrical connector 84 and electrical cover 76. The diaphragm valve 20 may also include an electrical insulator 90 disposed between the pole piece 56 and the printed circuit board 82.

As shown in FIG. 3, when the armature 62 is in the de-energized position, a clearance gap 92 is provided between the pole piece 56 and the armature 62. The armature 62 is slidably disposed within an armature sleeve 94 in the armature receiving end 34 of the solenoid body 26. The armature sleeve 94 includes an armature sleeve wall 96 and an armature sleeve flange 98. The armature sleeve wall 96 is positioned radially between the bobbin 58 and at least part of the armature 62. The armature sleeve flange 98 extends radially outwardly from the armature sleeve wall 96 towards the solenoid body 26. The armature sleeve wall 96 maintains coaxial alignment of armature 62 with the bobbin 58, the coil 54, and the solenoid body 26 during sliding displacement of the armature 62 between the energized and de-energized positions. Although other configurations are possible, the armature sleeve wall 96 may be integrally connected to the armature sleeve flange 98. The armature 62 may optionally include one or more flats 100 for holding the armature 62 during assembly of the diaphragm valve 20.

A biasing member 102, such as a coiled metal compression spring, is positioned around armature 62. The armature 62 includes a biasing member seat 104 that extends radially outwardly toward the solenoid body 26. The biasing member 102 has a first biasing member end 106 that contacts the biasing member seat 104 of the armature 62 and a second biasing member end 108 that contacts the armature sleeve flange 98. The biasing member 102 applies a biasing force 110 to the armature 62 that acts to bias the armature 62 towards the de-energized position (FIG. 3).

As shown in FIG. 4, when electricity is supplied to the coil 54, the coil 54 creates a magnetic field that causes the armature 62 to be magnetically attracted towards the pole piece 56. The magnetic field imparts a magnetic force 112 on the armature 62 that overcomes the biasing force 110 of biasing member 102, which results in movement of the armature 62 to the energized position (FIG. 4). As long as electricity is supplied to the coil 54, the armature 62 will be held in the energized position.

The diaphragm valve 20 includes a valve member 114 that is disposed in the valve body cartridge 24. The armature 62 includes a connection portion 116 and the valve member 114 is connected to the connection portion 116 of the armature 62 by threaded connection 118. Accordingly, the valve member 114 slides within the valve body cartridge 24 as the armature 62 moves between the energized and de-energized positions.

A diaphragm 120 is received in the diaphragm receiving end 32 of the valve body cartridge 24 between the connection portion 116 of the armature 62 and the valve member 114. More specifically, the threaded connection 118 between the armature 62 and the valve member 114 permits the diaphragm 120 to be clamped between the connection portion 116 of the armature 62 and the valve member 114. The diaphragm 120 provides an atmospheric seal for the diaphragm valve 20 to prevent a fluid, such as pressurized air, and contaminants from entering the solenoid body 26. The diaphragm 120 extends radially inwardly from the valve body cartridge 24 in a diaphragm plane 122 that is transverse to the longitudinal axis 28 when the armature 62 is in the de-energized position (FIG. 3). This means that the diaphragm 120 is substantially flat and does not have one or more bellows-like portions that have a U-shaped cross-section. The diaphragm 120 deflects away from the diaphragm plane 122 when the armature 62 moves to the energized position (FIG. 4). Although various configurations and construction materials are possible, the diaphragm 120 may be made of rubber.

The ported end 30 of the valve body cartridge 24 includes at least an inlet port 124 and an outlet port 126. As shown in FIG. 1, when the valve body cartridge 24 is installed in the manifold bore 40, the inlet and outlet ports 124, 126 are positioned in fluid communication with the passageways 52a, 52b of the manifold 22. A valve seat 128 is positioned between the inlet port 124 and the outlet port 126. The valve seat 128 may be integral with the valve body cartridge 24 or may alternatively be a separate component that is made of a softer material, such as rubber. The valve member 114 includes a valve seat engagement face 130 that contacts the valve seat 128 in a valve closed position (FIG. 3) and that is displaced away from the valve seat 128 in a valve open position (FIG. 4).

The valve body cartridge 24 also includes a piston bore 132. The valve member 114 has a piston 134 that is received in the piston bore 132 and is configured to slide within the piston bore 132 as the valve member 114 moves between the valve open and valve closed positions. Optionally, the diaphragm valve 20 may be configured as a pressure balanced valve. The inlet port 124 has a cross-sectional area. Where the diaphragm valve 20 has a pressure balanced configuration, the piston 134 has a piston surface area that is equal to the cross-sectional area of the inlet port 124.

In the valve closed position shown in FIG. 3, the biasing force 110 of the biasing member 102 pushes the armature 62 to the de-energized position and the valve member 114 in a valve closing direction 136. The valve seat engagement face 130 of the valve member 114 is held in contact with the valve seat 128 by the biasing force 110 of the biasing member 102. Accordingly, the diaphragm valve 20 prevents fluid flow between the inlet and outlet ports 124, 126 when diaphragm valve 20 is de-energized. In the valve open position shown in FIG. 4, the biasing force 110 of the biasing member 102 is overcome by the magnetic force 112 acting through pole piece 56 when the coil 54 is energized, which pulls the armature 62 to the energized position and the valve member 114 in a valve opening direction 138. The valve seat engagement face 130 of the valve member 114 moves away from the valve seat 128, thereby providing a flow path 140 from the inlet port 124 to the outlet port 126 when diaphragm valve 20 is energized.

The armature receiving end 34 of the solenoid body 26 includes an armature cavity 142. A diaphragm support sleeve 144 is disposed in the armature cavity 142. The diaphragm support sleeve 144 has a support sleeve wall 146 and a support sleeve flange 148. The support sleeve wall 146 extends longitudinally, is generally cylindrical in shape, and is co-axially aligned with the longitudinal axis 28. The support sleeve wall 146 extends annularly around and is spaced from the armature 62 to define a sleeve cavity 150 therein. The sleeve cavity 150 receives at least part of the armature 62. The biasing member 102 is positioned in the sleeve cavity 150 radially between the armature 62 and the support sleeve wall 146. The support sleeve flange 148 extends radially inwardly from the support sleeve wall 146 and is transverse to the longitudinal axis 28. More specifically, the support sleeve flange 148 extends radially inward of the biasing member seat 104 of the armature 62, while the connection portion 116 of the armature 62 is positioned radially inward of the support sleeve flange 148. The support sleeve flange 148 abuts and supports at least part of the diaphragm 120.

A spacer seal 152 is positioned between and contacts the support sleeve wall 146 and the armature sleeve flange 98. The spacer seal 152 accommodates tolerance variations between the diaphragm support sleeve 144 and the armature sleeve 94. The diaphragm support sleeve 144 is threadably engaged with the valve body cartridge 24. Specifically, the diaphragm support sleeve 144 includes a threaded shoulder 154 that extends radially outwardly from the support sleeve wall 146 and the valve body cartridge 24 includes internal threads 156 that engage the threaded shoulder 154 of the diaphragm support sleeve 144.

The diaphragm 120 may optionally include a peripheral lip 158. The peripheral lip 158 is received between the valve body cartridge 24 and the diaphragm support sleeve 144 to secure the diaphragm 120 within the diaphragm valve 20. In the illustrated example, the peripheral lip 158 of the diaphragm 120 has a ramp shaped cross-section; however, other shapes may be utilized.

The valve body cartridge 24 according to several embodiments is created of a polymeric material and is releasably, threadably connected to the solenoid body 26. A polymeric material is used for valve body cartridge 24 for multiple reasons, including: to reduce cost and weight of the diaphragm valve 20; to permit the complex geometry of valve body cartridge 24 to be more easily manufactured using a molding operation; to reduce or eliminate corrosion of the valve body cartridge 24 in an installed position in the manifold 22; and to eliminate any effects of the magnetic field on the valve body cartridge 24 during operation of the coil 54. In accordance with another embodiment, the valve body cartridge 24 is made of metal.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A diaphragm valve, comprising:
    a solenoid body having a coil and a pole piece positioned in the solenoid body;
    a valve body cartridge connected to the solenoid body, the valve body cartridge including a valve seat;
    an armature slidably disposed in the solenoid body for movement along a longitudinal axis between an energized position and a de-energized position;
    a valve member slidably disposed in the valve body cartridge, the valve member connected to the armature for movement therewith;
    a biasing member disposed in the solenoid body that acts to normally bias the armature toward the de-energized position;
    a diaphragm extending inwardly from the valve body cartridge that is received between the armature and the valve member such that the diaphragm deflects in response to movement of the armature and the valve member along the longitudinal axis; and
    a diaphragm support sleeve having a support sleeve wall that defines a sleeve cavity and a support sleeve flange that extends inwardly and is transverse to the support sleeve wall, wherein the sleeve cavity receives at least part of the armature, wherein the support sleeve flange abuts and supports at least part of the diaphragm, wherein the diaphragm is clamped between the valve body cartridge and the diaphragm support sleeve.

2. The diaphragm valve of claim 1, wherein the diaphragm support sleeve is threadably engaged with the valve body cartridge.

3. The diaphragm valve of claim 1, wherein the diaphragm extends in a diaphragm plane that is transverse to the longitudinal axis when the armature is in one of the energized or de-energized positions.

4. The diaphragm valve of claim 1, further comprising:
    a threaded connection between the armature and the valve member that permits the diaphragm to be clamped between the armature and the valve member.

5. The diaphragm valve of claim 1, wherein the pole piece includes a threaded end that engages internal threads in the solenoid body and permits an axial position of the pole piece to be selected by rotation of the pole piece with respect to the solenoid body.

6. The diaphragm valve of claim 1, wherein the diaphragm includes a peripheral lip that is received between the valve body cartridge and the diaphragm support sleeve to secure the diaphragm within the diaphragm valve.

7. The diaphragm valve of claim 6, wherein the peripheral lip of the diaphragm has a ramp shaped cross-section.

8. The diaphragm valve of claim 1, wherein the valve body cartridge includes at least an inlet port, an outlet port, wherein the valve seat is positioned between the inlet port and the outlet port, and wherein the valve member includes a valve seat engagement face that contacts the valve seat in a valve closed position and that is displaced away from the valve seat in a valve open position.

9. The diaphragm valve of claim 8, wherein the valve body cartridge includes a piston bore and the valve member includes a piston that is slidably received in the piston bore, wherein the inlet port has a cross-sectional area, and wherein the piston has a piston surface area that is equal to the cross-sectional area of the inlet port to create a pressure balanced condition.

10. The diaphragm valve of claim 1, wherein the biasing member is positioned in the sleeve cavity of the diaphragm support sleeve between the armature and the support sleeve wall.

11. The diaphragm valve of claim 10, wherein the armature includes a biasing member seat that extends outwardly toward the support sleeve wall and the biasing member having a first biasing member end that contacts the biasing member seat of the armature.

12. The diaphragm valve of claim 11, further comprising:
    a bobbin disposed in the solenoid body that supports the coil, at least part of the pole piece and at least part of the armature slidably received in the bobbin; and
    an armature sleeve including an armature sleeve wall and an armature sleeve flange, the armature sleeve wall disposed between the bobbin and at least part of the armature, the armature sleeve flange extending outwardly from the armature sleeve wall towards the solenoid body, and the biasing member including a second biasing member end that contacts the armature sleeve flange.

13. The diaphragm valve of claim 12, further comprising:
    a spacer seal positioned between and contacting the support sleeve wall and the armature sleeve flange.

14. A diaphragm valve, comprising:
    a solenoid body having a coil and a pole piece positioned in the solenoid body;
    a valve body cartridge connected to the solenoid body;
    an armature slidably disposed in the solenoid body for movement along a longitudinal axis between an energized position and a de-energized position, the armature including a biasing member seat that extends radially outwardly;
    a valve member slidably disposed in the valve body cartridge, the valve member connected to the armature for movement therewith;
    a biasing member extending around the armature that acts against the biasing member seat of the armature to normally bias the armature toward the de-energized position;
    a diaphragm extending radially inwardly from the valve body cartridge that is received between the armature and the valve member; and
    a diaphragm support sleeve having a support sleeve wall and a support sleeve flange, the support sleeve wall extending annularly about the biasing member and the support sleeve flange extending radially inwardly from the support sleeve wall such that the support sleeve flange abuts and supports at least part of the diaphragm, wherein the support sleeve flange extends radially inward of the biasing member seat of the armature.

15. The diaphragm valve of claim 14, wherein the biasing member has a first biasing member end that contacts the biasing member seat of the armature.

16. The diaphragm valve of claim 15, wherein the support sleeve flange extends radially inward of the biasing member seat of the armature.

17. The diaphragm valve of claim 15, wherein the diaphragm support sleeve includes a threaded shoulder that extends radially outwardly from the support sleeve wall and wherein the valve body cartridge includes internal threads that engage the threaded shoulder of the diaphragm support sleeve.

18. The diaphragm valve of claim 15, further comprising:
a bobbin disposed in the solenoid body that supports the coil, the bobbin extending annularly around at least part of the pole piece and at least part of the armature; and
an armature sleeve including an armature sleeve wall and an armature sleeve flange, the armature sleeve wall disposed radially between the bobbin and at least part of the armature, the armature sleeve flange extending radially outwardly from the armature sleeve wall towards the solenoid body, and the biasing member including a second biasing member end that contacts the armature sleeve flange.

19. The diaphragm valve of claim 18, further comprising:
a spacer seal positioned between and contacting the support sleeve wall and the armature sleeve flange to accommodate tolerance variations between the diaphragm support sleeve and the armature sleeve.

20. A diaphragm valve, comprising:
a manifold including a manifold bore;
a valve body cartridge received in the manifold bore, the valve body cartridge including a valve seat;
a solenoid body connected to the valve body cartridge, the solenoid body having a coil and a pole piece positioned in the solenoid body;
an armature slidably disposed in the solenoid body for movement along a longitudinal axis between an energized position and a de-energized position;
a valve member slidably disposed in the valve body cartridge, the valve member connected to the armature for movement therewith;
a biasing member disposed in the solenoid body that acts to normally bias the armature toward the de-energized position;
a diaphragm extending inwardly from the valve body cartridge that is received between the armature and the valve member such that the diaphragm deflects in response to movement of the armature and the valve member along the longitudinal axis; and
a diaphragm support sleeve having a longitudinally extending support sleeve wall that defines a sleeve cavity and a transverse support sleeve flange that extends inwardly from the longitudinally extending support sleeve wall, wherein the sleeve cavity receives at least part of the armature, wherein the transverse support sleeve flange abuts and supports at least part of the diaphragm, wherein the diaphragm is clamped between the valve body cartridge and the diaphragm support sleeve.

* * * * *